（12）United States Patent
Kitazume

(10) Patent No.: US 9,796,413 B2
(45) Date of Patent: Oct. 24, 2017

(54) ELECTRIC POWER STEERING APPARATUS

(71) Applicant: NSK LTD., Tokyo (JP)

(72) Inventor: Tetsuya Kitazume, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/913,818

(22) PCT Filed: May 13, 2015

(86) PCT No.: PCT/JP2015/063814
§ 371 (c)(1),
(2) Date: Feb. 23, 2016

(87) PCT Pub. No.: WO2016/017234
PCT Pub. Date: Apr. 2, 2016

(65) Prior Publication Data
US 2017/0137057 A1 May 18, 2017

(30) Foreign Application Priority Data

Jul. 31, 2014 (JP) .................................. 2014-156258

(51) Int. Cl.
*B62D 5/04* (2006.01)
*B62D 6/00* (2006.01)

(52) U.S. Cl.
CPC ......... *B62D 5/0466* (2013.01); *B62D 5/0463* (2013.01); *B62D 6/00* (2013.01)

(58) Field of Classification Search
CPC ...... B62D 5/0466; B62D 5/0463; B62D 6/00; B62D 6/008; B62D 15/025; B60W 10/20
See application file for complete search history.

(56) References Cited

U.S. PATENT DOCUMENTS 5,919,241 A 7/1999 Bolourchi et al.
2004/0079578 A1 4/2004 Kurishige et al.

FOREIGN PATENT DOCUMENTS

| JP | 2008-132918 A | 6/2008 |
| JP | 4685557 B2 | 5/2011 |
| JP | 2014-201258 A | 10/2014 |

OTHER PUBLICATIONS

Communication dated Feb. 16, 2017 from the European Patent Office in counterpart Application No. 15 82 8165.
International Search Report for PCT/JP2015/063814 dated Aug. 11, 2015.

*Primary Examiner* — Adam Mott
(74) *Attorney, Agent, or Firm* — Sughrue Mion, PLLC

(57) ABSTRACT

An electric power steering apparatus including a steering wheel returning control section for driving a motor by a compensation current command value. The apparatus calculates a target returning torque based on a steering angle and a vehicle speed, corrects the target returning torque with a steering torque and an assist torque, multiplies by a transmission characteristic corresponding to a virtual steering system characteristic based on a correction torque and a viscosity coefficient, multiplies a deviation between a target steering angle speed and an actual steering angle speed by a vehicle speed gain and a steering torque gain to obtain a steering wheel returning control gain, and performs control calculation with respect to the steering wheel returning control gain, performs an output limit in response to the vehicle speed gain and the steering torque gain, and obtain a steering wheel returning control current.

19 Claims, 7 Drawing Sheets

PRIOR ART

ELECTRIC POWER STEERING APPARATUS

CROSS REFERENCE TO RELATED APPLICATIONS

This application is a National Stage of International Application No. PCT/JP2015/063814 filed May 13, 2015, claiming priority based on Japanese Patent Application No. 2014-156258filed Jul. 31, 2014, the contents of all of which are incorporated herein by reference in their entirety.

TECHNICAL FIELD

The present invention relates to an electric power steering apparatus that performs a PWM-control with respect to a motor by means of an inverter based on a current command value and provides a steering system with an assist torque, and in particular to an electric power steering apparatus with high reliability that actively returns a steering wheel to a neutral position in a running state to return to a straight advancing state by calculating a target steering angle speed from a target returning torque corresponding to a steering angle and a vehicle speed and a transmission characteristic corresponding to a virtual steering system characteristic and correcting the current command value with a steering wheel returning control current so as to improve a function of steering wheel returning control.

BACKGROUND ART

An electric power steering apparatus which provides a steering mechanism of a vehicle with an assist torque by means of a rotational torque of a motor, applies a driving force of the motor as a steering assist torque to a steering shaft or a rack shaft by means of a transmission mechanism such as gears or a belt through a reduction mechanism. In order to accurately generate the assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM (Pulse Width Modulation) control.

A general configuration of the conventional electric power steering apparatus will be described with reference to FIG. 1. As shown in FIG. 1, a column shaft (a steering shaft or a handle shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Td of the steering wheel 1 and a steering angle sensor 14 for detecting a steering angle θ, and a motor 20 for assisting a steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of the steering torque Td detected by the torque sensor 10 and a vehicle speed V detected by a vehicle speed sensor 12, and controls a current supplied to the motor 20 on the basis of a voltage control command value Vref obtained by performing compensation and so on with respect to the current command value. Moreover, the steering angle sensor 14 is optional and it may not be arranged.

A CAN (Controller Area Network) 50 for transmitting/receiving various information about the vehicle is connected to the control unit 30, and it is also possible to receive the vehicle speed V from the CAN 50. Further, a non-CAN 51 for transmitting/receiving communications, analog/digital signals, radio waves, etc. except for the CAN 50 can also be connected to the control unit 30.

The control unit 30 mainly comprises a CPU (also including an MCU, an MPU, or the like), and general functions performed by programs within the CPU are shown in FIG. 2.

Functions and operations of the control unit 30 will be described with reference to FIG. 2. As shown in FIG. 2, the steering torque Td detected by the torque sensor 10 and the vehicle speed V detected by the vehicle speed sensor 12 (or from the CAN 50) are inputted into a current command value calculating section 31 for calculating a current command value Irefl. The current command value calculating section 31 calculates the current command value Irefl that is a control target value of a current supplied to the motor 20 based on the steering torque Td being inputted and the vehicle speed V being inputted and by means of an assist map or the like. The current command value Irefl is inputted into a current limiting section 33 through an adding section 32A. A current command value Irefm that a maximum current is limited, is inputted into a subtracting section 32B, and a deviation I (Irefm-Im) between the current command value Irefm and a motor current value Im being fed back, is calculated. The deviation I is inputted into a PI control section 35 for characteristic improvement of steering operations. A voltage control command value Vref that the characteristic is improved by the PI control section 35, is inputted into a PWM control section 36. Furthermore, the motor 20 is PWM-driven through an inverter 37 serving as a driving section. The current value Im of the motor 20 is detected by a motor current detector 38 and fed back to the subtracting section 32B. The inverter 37 uses FETs as driving elements and is comprised of a bridge circuit of FETs.

A compensation signal CM from a compensation signal generating section 34 is added in the adding section 32A, and characteristic compensation of the steering system is performed by the addition of the compensation signal CM so as to improve a convergence, an inertia characteristic and so on. The compensation signal generating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

In such an electric power steering apparatus, friction caused by the reduction gears and the rack-and-pinion mechanism is large, and an equivalent inertia moment around the steering shaft caused by the motor for generating the assist torque is large. Therefore, in a low vehicle speed range that the self-aligning torque (SAT) is small, steering wheel returning gets worse due to large friction. Hence, since the steering angle does not return to the neutral position in the straight advancing state in the case only by means of the SAT, it is necessary to return the steering angle to the neutral position by steering intervention of a driver, as a result, this leads to the workload of the driver.

On the other hand, in a high vehicle speed range that the SAT is large, since the SAT is large, although a steering angle speed tends to become fast as compared with the low vehicle speed, since an inertia moment is large, an inertia torque is also large, as a result, the steering wheel does not converge at the neutral position of the steering angle and an overshoot occurs, therefore vehicle characteristics are felt unstable.

Accordingly, in order to assist the steering wheel returning in the low vehicle speed and in order to make the vehicle characteristics stable in the high vehicle speed, it is necessary to increase the convergence. Hence, in order to achieve those needs, various control methods for performing a moderate assist at the time of the steering wheel returning have been proposed. In these control methods of the steering wheel returning, there is an electric power steering apparatus disclosed in Japanese Patent No. 4685557 (Patent Document 1) as a prior art for performing a smooth steering wheel returning control even in the case of the steering intervention by the driver.

In the apparatus of Patent Document 1, a controller configured so as to follow a target steering angle speed, calculates the target steering angle speed by correcting a base target steering angle speed with multiplication and addition based on a vehicle speed and a torque. In the case of the steering intervention by the driver, the apparatus of Patent Document 1 reduces an uncomfortable feeling felt by the driver during steering by correcting the target steering angle speed in a direction to which the torque is applied.

THE LIST OF PRIOR ART DOCUMENTS

Patent Documents

Patent Document 1: Japanese Patent No. 4685557

SUMMARY OF THE INVENTION

Problems to be Solved by the Invention

In order to realize a smooth steering wheel returning in a hands-free state, it is preferred that a steering angle acceleration does not fluctuate largely and the steering angle speed becomes "0" at the neutral position of the steering angle. However, in the apparatus disclosed in Patent Document 1, when setting the target steering angle speed, although the correction based on the steering torque is performed, the correction based on the assist torque is not performed. Since the assist torque is generally set to be smaller as the vehicle speed is higher, in the case of the correction based on the steering torque and the vehicle speed, there is a problem that it takes time to calculate a preferred correcting amount.

The present invention has been developed in view of the above-described circumstances, and the object of the present invention is to provide an electric power steering apparatus that is capable of realizing a smooth steering wheel returning control without the uncomfortable feeling by the correction based on a steering torque in which the vehicle characteristics are considered and the vehicle speed even in the case of the steering intervention by the driver in a straight-advancing running state.

Means for Solving the Problems

The present invention relates to an electric power steering apparatus that calculates a current command value based on a steering torque and a vehicle speed, drives a motor based on said current command value, and performs an assist control of a steering system by means of drive control of said motor, the above-described object of the present invention is achieved by that comprising: a steering wheel returning control section that calculates a steering wheel returning control current based on a steering angle, said current command value, said vehicle speed and a steering angle speed, and drives said motor by means of a compensation current command value obtained by adding said steering wheel returning control current to said current command value, wherein said steering wheel returning control section comprises a target returning torque calculating section that calculates a target returning torque based on said steering angle and said vehicle speed, a correcting section that corrects said target returning torque with said steering torque and an assist torque, a steering system characteristic section that multiplies by a transmission characteristic corresponding to a virtual steering system characteristic based on a correction torque corrected in said correcting section and a viscosity coefficient, a steering wheel returning control gain calculating section that multiplies a deviation between a target steering angle speed and an actual steering angle speed from said steering system characteristic section by a vehicle speed gain and a steering torque gain to obtain a steering wheel returning control gain, and a steering wheel returning control current calculating section that performs at least one control calculation of a P control calculation, an I control calculation and a D control calculation with respect to said steering wheel returning control gain, performs an output limit in response to said vehicle speed gain and said steering torque gain, and obtain said steering wheel returning control current.

Further, the above-described object of the present invention is more effectively achieved by that wherein said target returning torque calculating section uses said vehicle speed as a parameter, and said target returning torque is a characteristic of gradually becoming large as said steering angle becomes large; or wherein said target returning torque is a characteristic of becoming large as said vehicle speed becomes high; or wherein said steering torque gain is a characteristic of being fixed when said steering torque is less than or equal to a predetermined value T1, gradually decreasing when said steering torque exceeds said predetermined value T1 and is under a predetermined value T2 (>said predetermined value T1), and becoming "0" when said steering torque is more than or equal to said predetermined value T2; or wherein said viscosity coefficient is a characteristic of being fixed when said vehicle speed is less than or equal to a predetermined value V3, gradually increasing when said vehicle speed exceeds said predetermined value V3 and is under a predetermined value V4 (>said predetermined value V3), and becoming a fixed value when said vehicle speed is more than or equal to said predetermined value V4; or wherein said vehicle speed gain is a characteristic of being fixed when said vehicle speed is less than or equal to a predetermined value V1, gradually increasing when said vehicle speed exceeds said predetermined value V1 and is under a predetermined value V2 (>said predetermined value V1), and becoming a fixed value when said vehicle speed is more than or equal to said predetermined value V2; or wherein said steering angle speed is subtracted after passing through a phase-lead filter with respect to said target steering angle speed; or wherein a maximum value of said steering wheel returning control current is limited by a limiter; or wherein said P control calculation and said I control calculation are performed with respect to said steering wheel returning control gain.

Effects of the Invention

According to an electric power steering apparatus of the present invention, since it is possible to set a virtual inertia moment and a virtual viscosity coefficient in a simplified virtual steering system model, even in the case of having an inertia moment and a viscosity coefficient that are not preferred as a steering system characteristic, it becomes possible to get close to the virtual inertia moment and the virtual viscosity coefficient by obtaining a target steering angle speed by means of the virtual steering system model and performing a feedback control. Consequently, it is possible to actively return the steering wheel to the neutral position without the uncomfortable feeling in the running state to return to the straight advancing state.

BRIEF DESCRIPTION OF THE DRAWINGS

In the accompanying drawings.

MODE FOR CARRYING OUT THE INVENTION

Figure 1:
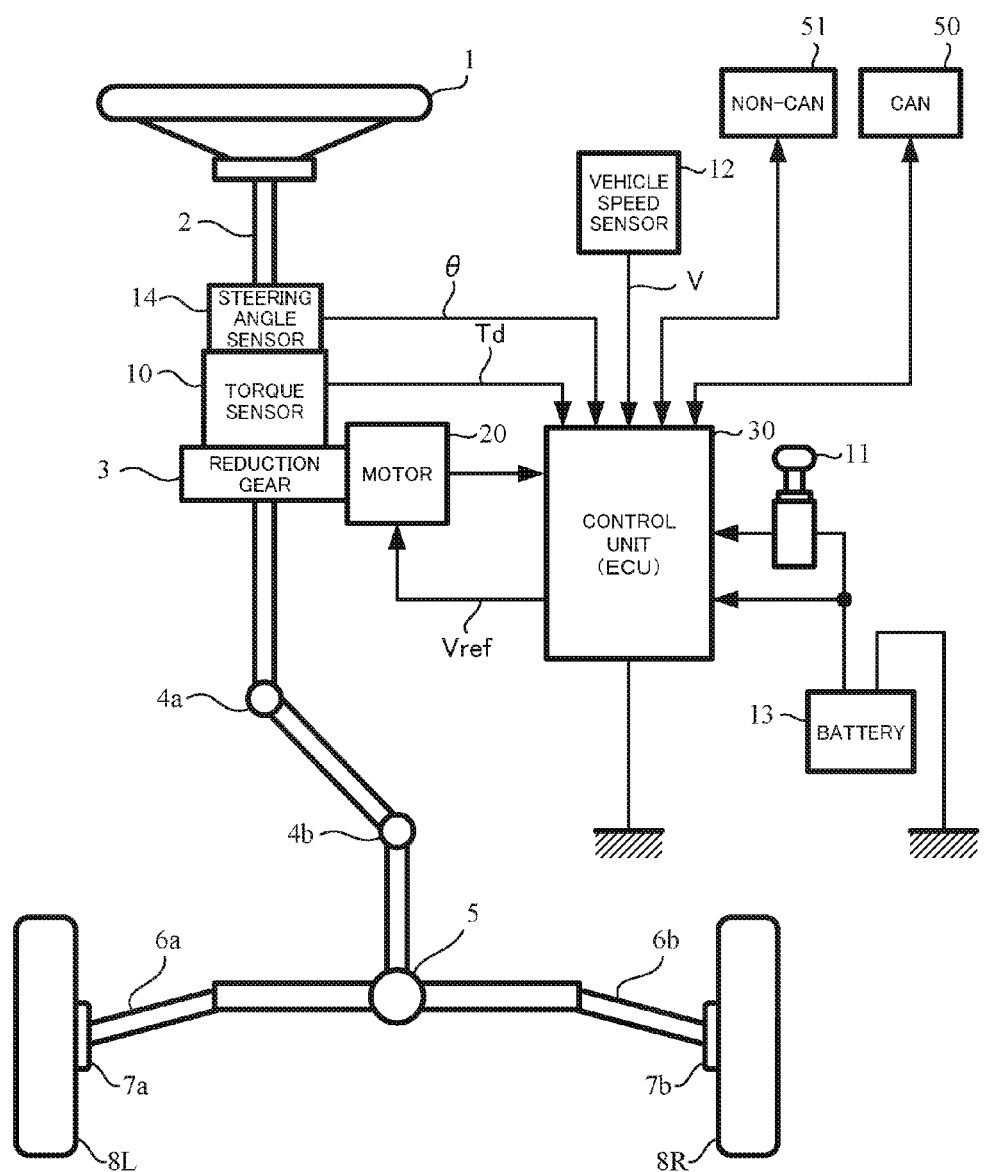
FIG. 1 is a configuration diagram illustrating a general outline of an electric power steering apparatus.
Figure 2:
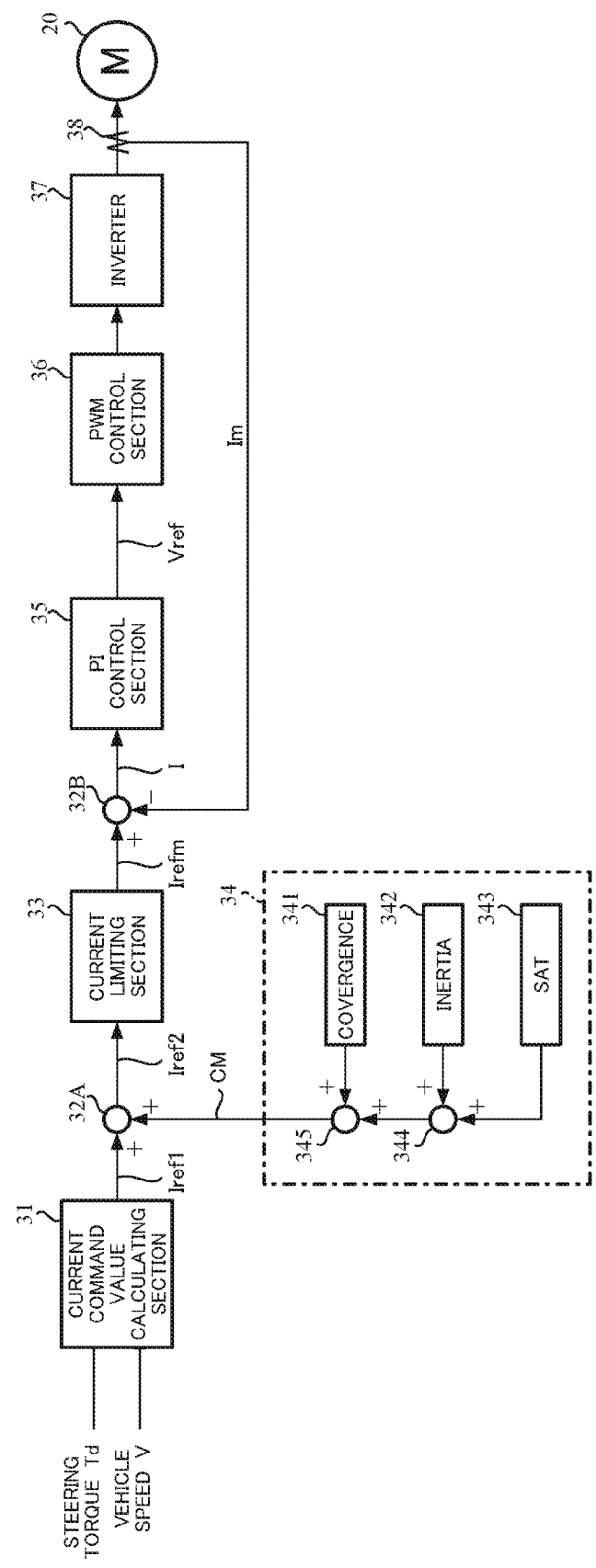
FIG. 2 is a block diagram showing a configuration example of a control system of the electric power steering apparatus.

In an electric power steering apparatus, operations are hindered due to the friction of the reduction gears and the rack-and-pinion mechanism for transmitting the assist torque, the steering wheel does not return to the neutral position and it is sometimes difficult for the vehicle to become the straight advancing state in spite of a running state to want to return to the straight advancing state. Therefore, it is possible to actively return the steering wheel to the neutral position in the running state to return to the straight advancing state by correcting (compensating) the current command value with a steering wheel returning control current corresponding to the steering angle and the vehicle speed.

The present invention defines a target returning torque (a target value) in response to the steering angle and the vehicle speed, adds the steering torque and the assist torque that are applied to the column shaft to the target returning torque, and multiplies this addition result by a transmission characteristic corresponding to a virtual steering system characteristic so as to calculate a target steering angle speed. The present invention performs at least one of a P (proportional) control, an I (integral) control and a D (differential) control with respect to a deviation between the target steering angle speed and an actual steering angle speed. In the present invention, it is possible to realize a steering wheel returning control with a natural feeling even in the case of the steering intervention by the driver by performing a feedback control by means of the target steering angle speed calculated by dividing the target returning torque and the steering torque by a viscosity coefficient.

A simplified virtual steering system model of the present invention is a model that calculates a target steering angle speed $\omega_0$ by multiplying the sum of a target returning torque (a target value) Tr obtained from a steering angle θ and a vehicle speed V, a steering torque Td and an assist torque Ta by a steering system transmission function corresponding to a virtual inertia moment J and a virtual viscosity coefficient C of the steering system.

Since it is possible to set the virtual inertia moment J and the virtual viscosity coefficient C of the steering system by using the virtual steering system model (a steering system characteristic section), it becomes possible to arbitrarily determine the steering system characteristic. Further, since the steering intervention by the driver in which the assist torque Ta is also added, is also considered in the virtual steering system model, it is possible to provide a smooth steering wheel returning even in a state that the driver is performing steering operation.

Here, in the case that it is assumed that the steering system does not have static friction, Coulomb friction and an elastic term, a force balance equation of the target returning torque Tr, the steering torque Td and the assist torque Ta becomes the following Expression 1.

$$T_r + T_d + T_a = J\frac{d^2\theta}{dt^2} + C\frac{d\theta}{dt} \qquad \text{[Expression 1]}$$

Where, J is an inertia moment of a virtual steering system and C is a viscosity coefficient of the virtual steering system.

And then, since an actual steering angle speed ω is a time differential of the steering angle θ, the following Expression 2 holds.

$$\omega = d\theta/dt \qquad \text{[Expression 2]}$$

Accordingly, when setting the target steering angle speed as $\omega_0$, the following Expression 3 holds.

$$T_r + T_d + T_a = J\frac{d\omega_0}{dt} + C\omega_0 \qquad \text{[Expression 3]}$$

When setting s as a Laplace operator, the above Expression 3 becomes the following Expression 4. The following Expression 5 can be obtained by arranging the following Expression 4.

$$Tr+Td+Ta=sJ\omega_0+C\omega_0 \qquad \text{[Expression 4]}$$

$$Tr+Td+Ta=(sJ+C)\omega_0 \qquad \text{[Expression 5]}$$

Therefore, the target steering angle speed $\omega_0$ becomes the following Expression 6 from the above Expression 5.

$$\omega_0 = \frac{T_r + T_d + T_a}{sJ + C} \qquad \text{[Expression 6]}$$

The following Expression 7 can be obtained by arranging the above Expression 6.

$$\omega_0 = \frac{1}{Js+C}(T_r + T_d + T_a) \quad \text{[Expression 7]}$$

The target steering angle speed $\omega_0$ is obtained from the above Expression 7. Where, $1/(Js+C)$ represents a transmission characteristic of the virtual steering system model, and $Tr+Td+Ta$ represents the sum of the target returning torque, the steering torque and the assist torque.

The present invention multiplies by a vehicle speed gain corresponding to the vehicle speed V so as to set various returning performances of the steering wheel and the convergence of the vehicle in response to the vehicle speed. Further, since the steering wheel returning control is mainly required in the case that the steering torque Td applied to the column shaft is small and the influence of a friction torque is relatively large, the steering wheel returning control does not require a large output when the steering torque Td is large. Accordingly, the present invention multiplies by a steering torque gain Th which becomes small in response to the steering torque Td. According to the present invention, it is possible to realize a smooth steering wheel returning and also provide a steering wheel returning control without the uncomfortable feeling even in the case that the driver performed steering operation by setting $\omega_0$ as the target steering angle speed and performing a control in response to a deviation between the target steering angle speed $\omega_0$ and the actual steering angle speed $\omega$.

Hereinafter, embodiments of the present invention will be described in detail with reference to the accompanying drawings.

Figure 3:
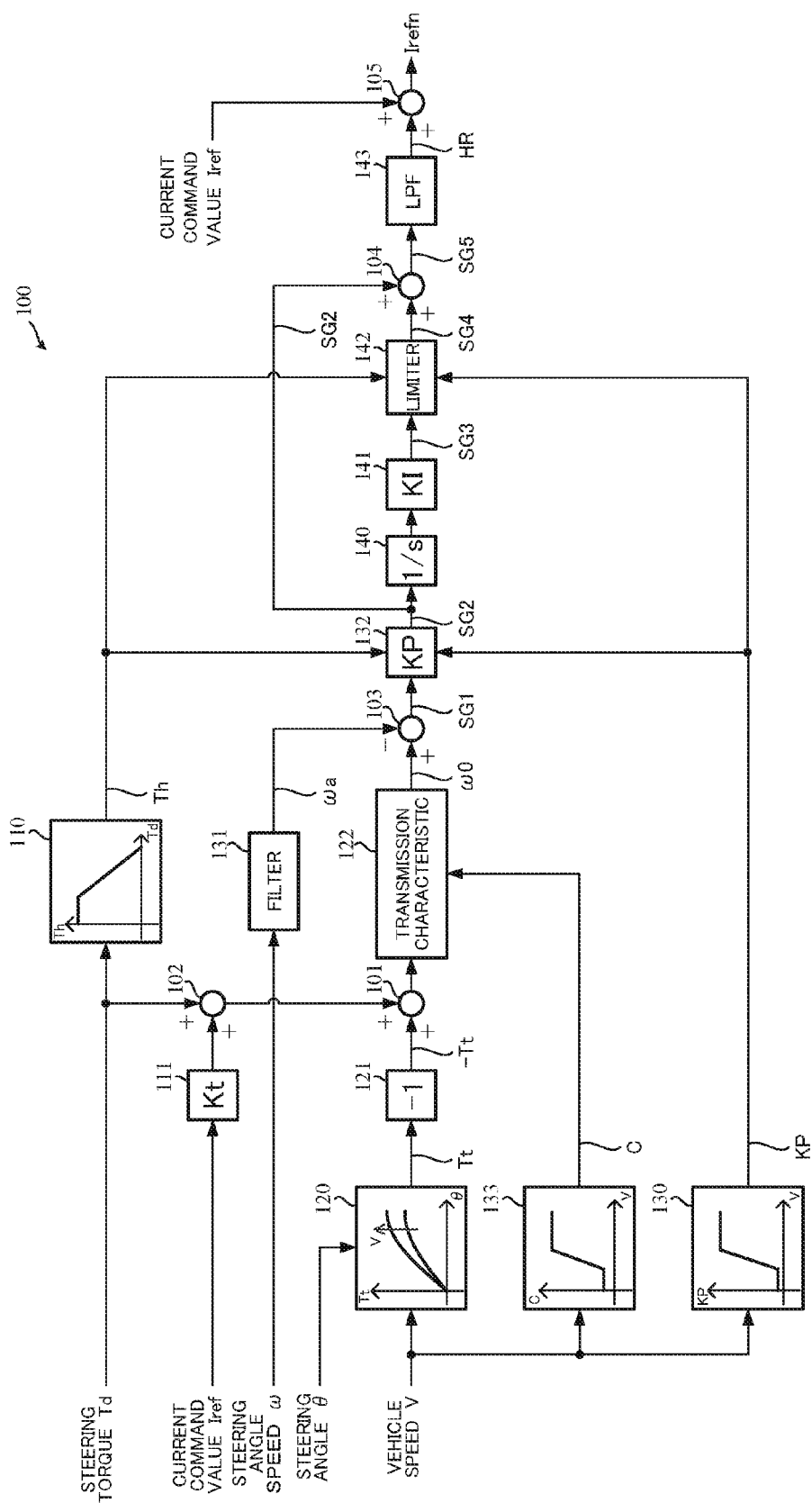
FIG. 3 is a block diagram showing a configuration example of the present invention.

FIG. 3 shows a configuration example of a steering wheel returning control section 100 according to the present invention. As shown in FIG. 3, the steering torque Td is inputted into a steering torque gain section 110 for outputting the steering torque gain Th and an adding section 102, the steering angle θ is inputted into a target returning torque calculating section 120 for calculating a target value Tt being the target returning torque. Further, the vehicle speed V is inputted into the target returning torque calculating section 120, a vehicle speed gain section 130 for outputting a vehicle speed gain KP, and a viscosity coefficient output section 133 for outputting the viscosity coefficient C. The steering angle speed ω is inputted into a filter 131. Since the filter 131 is used for phase lead, in the case that the steering angle speed ω has a sufficient responsiveness, the filter 131 is not required. Moreover, a current command value Iref is multiplied by a gain Kt in a gain section 111 and then inputted into the adding section 102 as the assist torque Ta. Consequently, an addition result of the adding section 102 becomes the sum of the steering torque Td and the assist torque Ta.

The target value (the target returning torque) Tt calculated based on the steering angle θ and the vehicle speed V in the target returning torque calculating section 120, is inputted into an adding section 101 after its sign is inverted in an inverting section 121, added to the addition result of the adding section 102 in the adding section 101, and then inputted into a transmission characteristic section 122. The transmission characteristic section 122 determines the transmission function from the inertia moment J and the viscosity coefficient C in response to the above Expression 5, the target steering angle speed $\omega_0$ is outputted from the transmission characteristic section 122 by multiplication, and then the target steering angle speed $\omega_0$ is addition-inputted into a subtracting section 103. A steering angle speed ωa from the filter 131 is subtraction-inputted into the subtracting section 103, and a deviation SG1 between the target steering angle speed $\omega_0$ and the steering angle speed ωa that is a subtraction result of the subtracting section 103, is inputted into a multiplying section 132.

Further, the steering torque gain Th outputted from the steering torque gain section 110 is inputted into the multiplying section 132 and a limiter 142, and the vehicle speed gain KP from the vehicle speed gain section 130 is also inputted into the multiplying section 132 and the limiter 142.

A steering wheel returning control gain SG2 from the multiplying section 132 which multiplies the deviation SG1 by the steering torque gain Th and the vehicle speed gain KP is inputted into an adding section 104, and also inputted into an integral control section 140 for characteristic improvement and then inputted into the limiter 142 after passing through an integral gain section 141. A signal SG4 that the output is limited by means of the limiter 142 in response to the steering torque gain Th and the vehicle speed gain KP, is added to the steering wheel returning control gain SG2 in the adding section 104, and then outputted as a steering wheel returning control current HR after passing through an LPF 143 for noise removing. The integral compensates a low steering torque range which is easy to be influenced by friction and particularly makes itself work well in a range which is affected by friction with hands free. A corrected compensation current command value Irefn obtained by being corrected (compensated) by adding the steering wheel returning control current HR to the current command value Iref in an adding section 105, is inputted into a motor drive system.

A correcting section comprises the inverting section 121, the gain section 111 and the adding sections 101 and 102. The steering system characteristic section comprises the viscosity coefficient output section 133 and the transmission characteristic section 122. A steering wheel returning control gain calculating section comprises the steering torque gain section 110, the vehicle speed gain section 130, the filter 131, the subtracting section 103 and the multiplying section 132. A steering wheel returning control current calculating section comprises the integral control section 140, the integral gain section 141, the limiter 142, the adding section 104 and the LPF 143.

Figure 4:
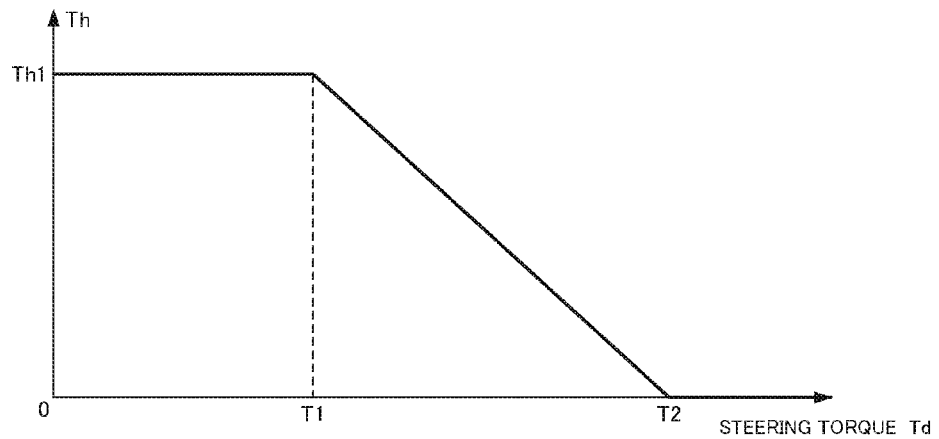
FIG. 4 is a characteristic diagram showing an output gain example of a steering torque gain section.
Figure 5:
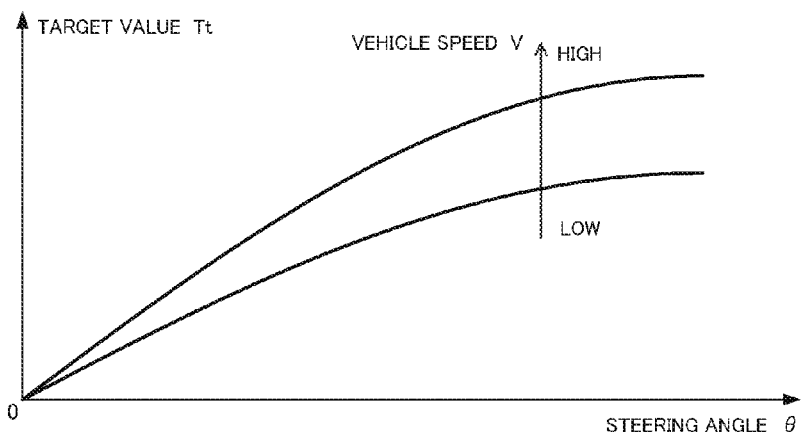
FIGS. 5(A) and 5(B) are characteristic diagrams showing output examples of a target returning torque calculating section.
Figure 5:
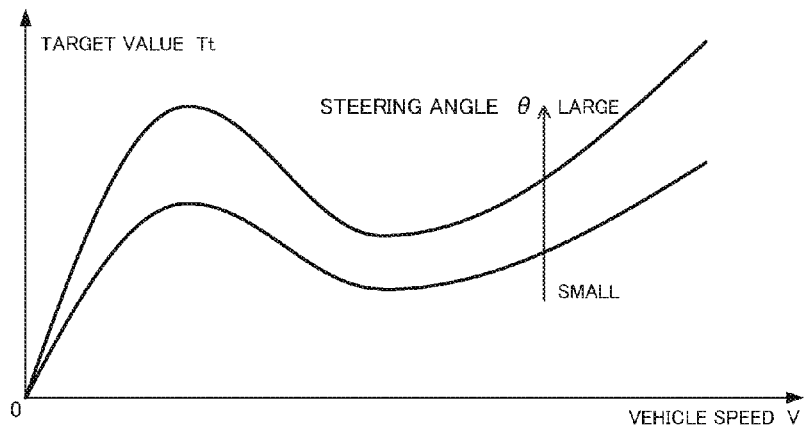
Figure 6:
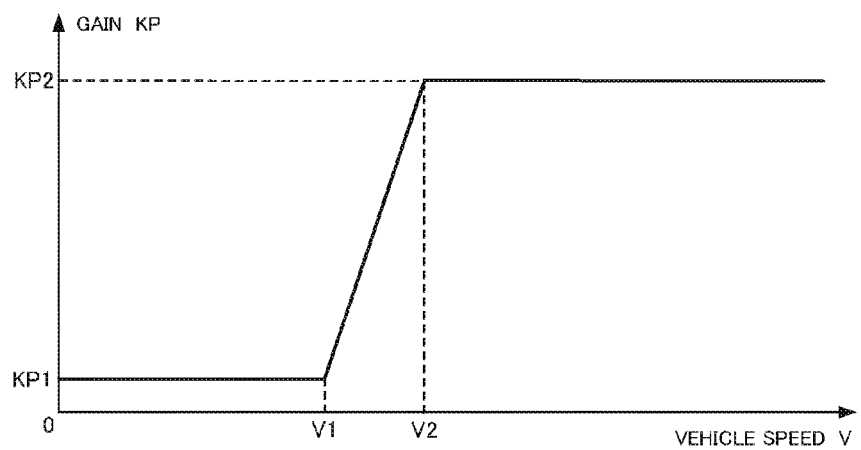
FIG. 6 is a characteristic diagram showing an output example of a vehicle speed gain section.
Figure 7:
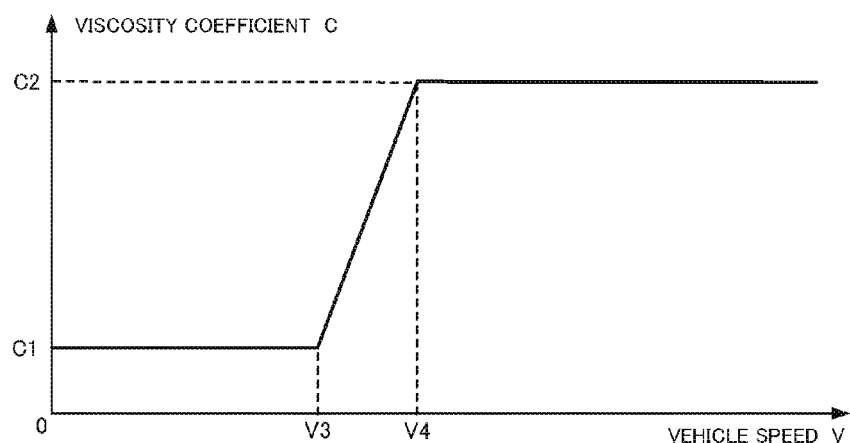
FIG. 7 is a characteristic diagram showing an output example of a viscosity coefficient output section.

The steering torque gain section 110 has a characteristic shown in FIG. 4. As shown in FIG. 4, the characteristic of the steering torque gain section 110 is an output characteristic of outputting a fixed value gain Th1 when the steering torque Td is less than or equal to T1, gradually decreasing when the steering torque Td exceeds T1, and becoming gain "0" when the steering torque Td is more than or equal to T2. Further, the target returning torque calculating section 120 is an output characteristic shown in FIG. 5(A) that the target value Tt gradually becomes large as the steering angle θ becomes large, and is an output characteristic shown in FIG. 5(B) that the target value Tt does not increase monotonically and varies as the vehicle speed V becomes high. The vehicle speed gain section 130 has a characteristic shown in FIG. 6. As shown in FIG. 6, the characteristic of the vehicle speed gain section 130 is a characteristic that the vehicle speed gain KP is a small gain KP1 and fixed when the vehicle speed V is at least less than or equal to a vehicle speed V1, the vehicle speed gain KP gradually becomes large when the vehicle speed V exceeds the vehicle speed V1, and the vehicle speed gain KP is a large gain KP2 and fixed when the vehicle speed V is more than or equal to a vehicle speed V2. However, the characteristic of the vehicle speed gain section 130 is not limited to such a characteristic shown in FIG. 6. Further, the viscosity coefficient output section 133 for varying the viscosity coefficient C in response to the vehicle speed V has a characteristic shown in FIG. 7. As shown in FIG. 7, the characteristic of the viscosity coefficient output section 133 is a characteristic that the viscosity coefficient C is a small viscosity coefficient C1 and fixed when the vehicle speed V is at least less than or equal to a vehicle speed V3, the viscosity coefficient C gradually becomes large when the vehicle speed V exceeds the vehicle speed V3 and is under a vehicle speed V4 (>V3), and the viscosity coefficient C is a large viscosity coefficient C2 and fixed when the vehicle speed V is more than or equal to the vehicle speed V4. However, the characteristic of the viscosity coefficient output section 133 is not limited to such a characteristic shown in FIG. 7.

In such a configuration, an operation example of the present invention will be described with reference to a flowchart shown in FIGS. 8 and 9.

Firstly, the steering wheel returning control section 100 inputs (reads out) the steering torque Td, the current command value Iref, the vehicle speed V, the steering angle θ and the steering angle speed ω (step S1), and the steering torque gain section 110 outputs the steering torque gain Th (step S2). The gain section 111 calculates the assist torque Ta by multiplying the current command value Iref by the gain Kt (step S3), and the assist torque Ta is added to the steering torque Td in the adding section 102 and then inputted into the adding section 101 (step S4).

Further, the target returning torque calculating section 120 calculates the target value Tt based on the steering angle θ and the vehicle speed V that are inputted (step S10), the inverting section 121 performs a sign inversion of the target value Tt (step S11), and then the target value Tt after the sign inversion is inputted into the adding section 101 to perform an addition (step S12). The vehicle speed gain section 130 outputs the vehicle speed gain KP corresponding to the vehicle speed V (step S13), and the viscosity coefficient output section 133 outputs the viscosity coefficient C corresponding to the vehicle speed V (step S14). The viscosity coefficient C is inputted into the transmission characteristic section 122 and multiplied by the transmission characteristic, the transmission characteristic section 122 outputs the target steering angle speed $\omega_0$, and the target steering angle speed $\omega_0$ is addition-inputted into the subtracting section 103 (step S20).

On the other hand, a phase-lead processing is performed by the filter 131 with respect to the actual steering angle speed ω, the actual steering angle speed ω after the phase-lead processing is subtraction-inputted into the subtracting section 103 as the steering angle speed ωa (step S21), and the deviation SG1 between the target steering angle speed ω0 and the steering angle speed ωa obtained by the subtracting section 103 is inputted into the multiplying section 132. The steering torque gain Th and the vehicle speed gain KP are inputted into the multiplying section 132, and the multiplying section 132 obtains the steering wheel returning control gain SG2 by multiplication of the deviation SG1, the steering torque gain Th and the vehicle speed gain KP (step S22). The integral control section 140 performs an integration processing with respect to the steering wheel returning control gain SG2 (step S23), further the steering wheel returning control gain SG2 after the integration processing is multiplied by an integral gain KI in the integral gain section 141 (step S24), and then the limiter 142 performs a limit processing with respect to the output of the integral gain section 141 (step S30).

A signal obtained after the limit processing performed by the limiter 142 is inputted into the adding section 104 and added to the steering wheel returning control gain SG2 in the adding section 104 (step S31), the LPF 143 performed a filter processing with respect to the output of the adding section 104 (step S32), and the LPF 143 outputs the steering wheel returning control current HR (step S33). The adding section 105 adds the steering wheel returning control current HR to the current command value Iref so as to correct and then outputs the compensation current command value Irefn (step S33).

Moreover, it is also possible to obtain the steering angle speed by a product of a motor angle speed and a gear ratio, and it is also possible to vary the transmission characteristic of the virtual steering system model in response to the vehicle speed, the steering angle, steering wheel turning state/steering wheel returning state/steering wheel holding state. Further, it is also possible to add a virtual friction characteristic to the virtual steering system model, and it is also possible to obtain the target returning torque by a product of the base target steering angle speed and the viscosity coefficient.

Figure 8:
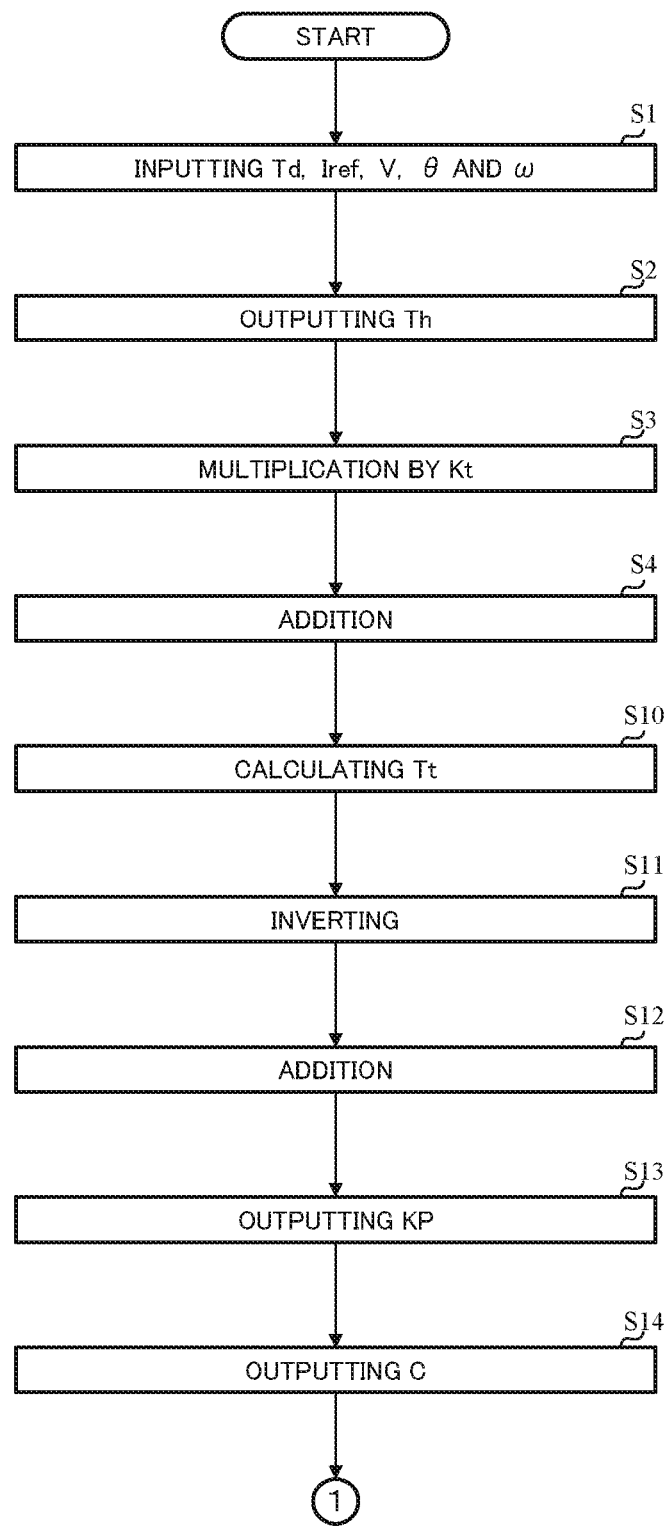
FIG. 8 is one part of a flowchart showing an operation example of the present invention.
Figure 9:
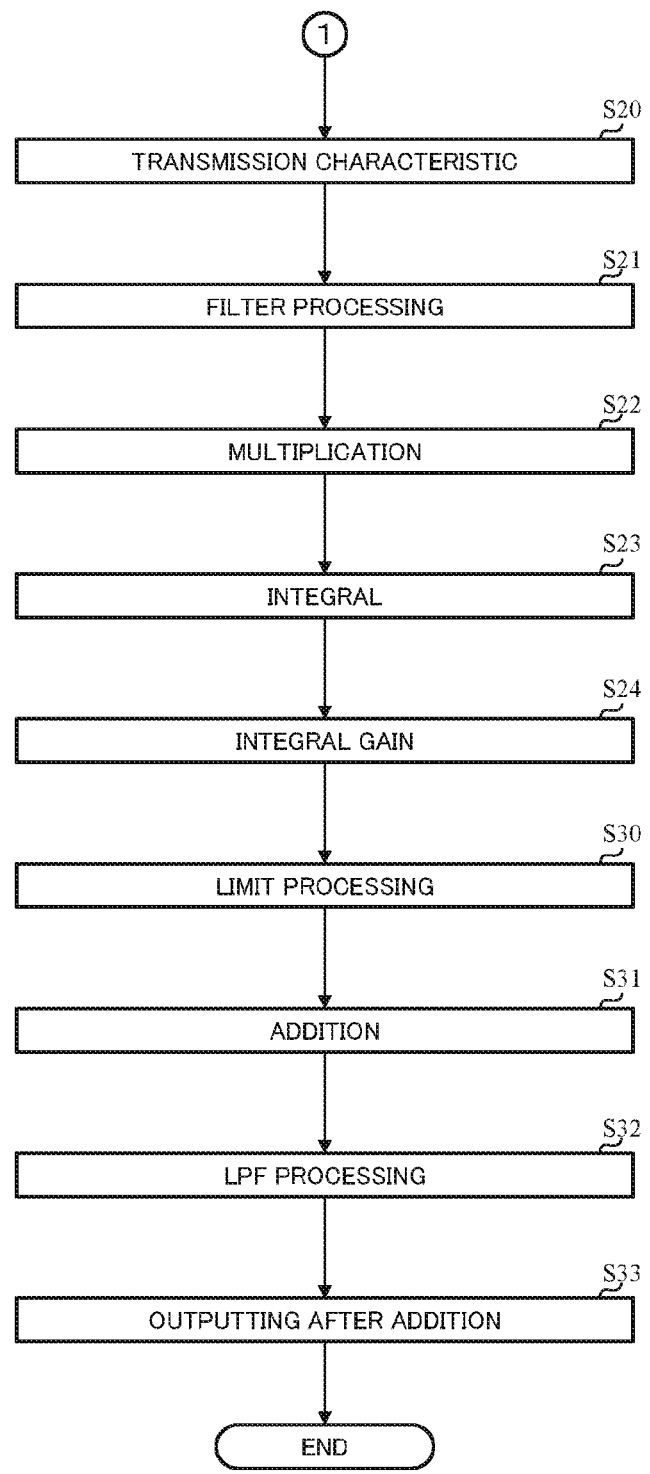
FIG. 9 is another part of the flowchart showing the operation example of the present invention.

Furthermore, it is possible to appropriately change the order of data inputting, calculating and processing of FIGS. 8 and 9. In the above embodiment, although the I (integral) control calculation is performed with respect to the steering wheel returning control gain, in the present invention, it is also possible to perform all of the P (proportional) control calculation, the I control calculation and the D (differential) control calculation, and further, it is also possible to perform at least one control calculation of the P control calculation, the I control calculation and the D control calculation.

EXPLANATION OF REFERENCE NUMERALS 1 steering wheel (handle)
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI control section
36 PWM control section
37 inverter
50 CAN
100 steering wheel returning control section
110 steering torque gain section
111 gain section
120 target returning torque calculating section
121 inverting section
122 transmission characteristic section
130 vehicle speed gain section
131 filter
133 viscosity coefficient output section
140 integral control section
142 limiter
143 low pass filter (LPF)

The invention claimed is:
1. An electric power steering apparatus that calculates a current command value based on a steering torque and a vehicle speed, drives a motor based on said current command value, performs an assist control of a steering system by means of drive control of said motor, comprising:
- a hardware controller which controls said motor and which executes a steering wheel return control in which a steering wheel returning control current is calculated based on a steering angle, said current command value, said vehicle speed, and a steering angle speed, and said steering wheel returning control is outputted,
- wherein said controller drives said motor based on a compensation current command value obtained by adding said steering wheel returning control current with said current command value,
- wherein said controller further executes following operations:
  - calculates a target returning torque based on said steering angle and said vehicle speed;
  - outputs a correction torque which is corrected by adding an added torque value of an assist torque obtained by gain-multiplying said current command value and said steering torque, with a value which is obtained by inverting said target returning torque by an inverter;
  - outputs a target steering angle speed by multiplying said correction torque by a transmission characteristic corresponding to a virtual steering system characteristic based on a viscosity coefficient obtained based on said vehicle speed and an inertia moment;
  - obtains a steering wheel returning control gain by multiplying a deviation between said target steering angle speed and an actual steering angle speed by a vehicle speed gain obtained based on said vehicle speed and a steering torque gain obtained based on said steering torque; and
  - performs at least one control calculation of a proportional control calculation, an integration control calculation and a derivative control calculation with respect to said steering wheel returning control gain, performs an output limit in response to said vehicle speed gain and said steering torque gain, and outputs said steering wheel returning control current by limiting a result of said control calculation with said vehicle speed gain and said steering torque gain.

2. The electric power steering apparatus according to claim 1, wherein said controller uses said vehicle speed as a parameter, and said target returning torque has a characteristic of gradually becoming large as said steering angle becomes large.

3. The electric power steering apparatus according to claim 2, wherein said target returning torque has a characteristic of becoming large as said vehicle speed becomes high.

4. The electric power steering apparatus according to claim 1, wherein said steering torque gain has a characteristic of being fixed when said steering torque is less than or equal to a predetermined value T1, gradually decreasing when said steering torque exceeds said predetermined value T1 and is under a predetermined value T2, and becoming "0" when said steering torque is more than or equal to said predetermined value T2.

5. The electric power steering apparatus according to claim 2, wherein said steering torque gain has a characteristic of being fixed when said steering torque is less than or equal to a predetermined value T1, gradually decreasing when said steering torque exceeds said predetermined value T1 and is under a predetermined value T2, and becoming "0" when said steering torque is more than or equal to said predetermined value T2.

6. The electric power steering apparatus according to claim 3, wherein said steering torque gain has a characteristic of being fixed when said steering torque is less than or equal to a predetermined value T1, gradually decreasing when said steering torque exceeds said predetermined value T1 and is under a predetermined value T2, and becoming "0" when said steering torque is more than or equal to said predetermined value T2.

7. The electric power steering apparatus according to claim 1, wherein said viscosity coefficient has a characteristic of being fixed when said vehicle speed is less than or equal to a predetermined value V3, gradually increasing when said vehicle speed exceeds said predetermined value V3 and is under a predetermined value V4, and becoming a fixed value when said vehicle speed is more than or equal to said predetermined value V4.

8. The electric power steering apparatus according to claim 2, wherein said viscosity coefficient has a characteristic of being fixed when said vehicle speed is less than or equal to a predetermined value V3, gradually increasing when said vehicle speed exceeds said predetermined value V3 and is under a predetermined value V4, and becoming a fixed value when said vehicle speed is more than or equal to said predetermined value V4.

9. The electric power steering apparatus according to claim 3, wherein said viscosity coefficient has a characteristic of being fixed when said vehicle speed is less than or equal to a predetermined value V3, gradually increasing when said vehicle speed exceeds said predetermined value V3 and is under a predetermined value V4, and becoming a fixed value when said vehicle speed is more than or equal to said predetermined value V4.

10. The electric power steering apparatus according to claim 4, wherein said viscosity coefficient has a characteristic of being fixed when said vehicle speed is less than or equal to a predetermined value V3, gradually increasing when said vehicle speed exceeds said predetermined value V3 and is under a predetermined value V4, and becoming a fixed value when said vehicle speed is more than or equal to said predetermined value V4.

11. The electric power steering apparatus according to claim 1, wherein said vehicle speed gain has a characteristic of being fixed when said vehicle speed is less than or equal to a predetermined value V1, gradually increasing when said vehicle speed exceeds said predetermined value V1 and is under a predetermined value V2, and becoming a fixed value when said vehicle speed is more than or equal to said predetermined value V2.

12. The electric power steering apparatus according to claim 2, wherein said vehicle speed gain has a characteristic of being fixed when said vehicle speed is less than or equal to a predetermined value V1, gradually increasing when said vehicle speed exceeds said predetermined value V1 and is under a predetermined value V2, and becoming a fixed value when said vehicle speed is more than or equal to said predetermined value V2.

13. The electric power steering apparatus according to claim 3, wherein said vehicle speed gain has a characteristic of being fixed when said vehicle speed is less than or equal to a predetermined value V1, gradually increasing when said vehicle speed exceeds said predetermined value V1 and is under a predetermined value V2, and becoming a fixed value when said vehicle speed is more than or equal to said predetermined value V2.

14. The electric power steering apparatus according to claim 4, wherein said vehicle speed gain has a characteristic of being fixed when said vehicle speed is less than or equal to a predetermined value V1, gradually increasing when said vehicle speed exceeds said predetermined value V1 and is under a predetermined value V2, and becoming a fixed value when said vehicle speed is more than or equal to said predetermined value V2.

15. The electric power steering apparatus according to claim 7, wherein said vehicle speed gain has a characteristic of being fixed when said vehicle speed is less than or equal to a predetermined value V1, gradually increasing when said vehicle speed exceeds said predetermined value V1 and is under a predetermined value V2, and becoming a fixed value when said vehicle speed is more than or equal to said predetermined value V2.

16. The electric power steering apparatus according to claim 1, wherein said deviation is calculated by phase-lead processing said actual steering angle speed at a phase-lead filter.

17. The electric power steering apparatus according to claim 1, wherein a maximum value of said steering wheel returning control current is limited by a limiter of which limiting value is variable in response to said vehicle speed gain and said steering torque gain.

18. The electric power steering apparatus according to claim 1, wherein said proportional control calculation and said integration control calculation are performed with respect to said steering wheel returning control gain.

19. An electric power steering apparatus comprising:
a steering wheel;
a motor which generates an assistance force to a steering mechanism;
an angle detection device which detects a steering angle of said steering mechanism;
a steering torque sensor which detects a steering torque of said steering wheel; and
a processor which calculates a current command value based on the detected steering torque and a vehicle speed and drives said motor based on said current command value,
wherein said processor further executes a steering wheel return control operation in which a steering wheel returning control current is calculated based on said steering angle, said calculated current command value, said vehicle speed, and a steering angle speed, and outputs said steering wheel returning control current to said motor,
wherein said processor drives said motor based on a compensation current command value obtained by adding said steering wheel returning control current with said current command value,
wherein said processor further calculates a target returning torque based on said steering angle and said vehicle speed, outputs a correction torque which is corrected by adding an added torque value of an assist torque obtained by gain-multiplying said current command value and said steering torque, with a value which is obtained by inverting said target returning torque by an inverter, outputs a target steering angle speed by multiplying said correction torque by a transmission characteristic corresponding to a virtual steering system characteristic based on a viscosity coefficient obtained based on said vehicle speed and an inertia moment, obtains a steering wheel returning control gain by multiplying a deviation between said target steering angle speed and an actual steering angle speed by a vehicle speed gain obtained based on said vehicle speed and a steering torque gain obtained based on said steering torque, performs at least one control calculation of a proportional control calculation, an integration control calculation and a derivative control calculation with respect to said steering wheel returning control gain, performs an output limit in response to said vehicle speed gain and said steering torque gain, and outputs said steering wheel returning control current by limiting a result of said control calculation with said vehicle speed gain and said steering torque gain.

* * * * *